E. P. LYNCH & E. A. WRIGHT.
CULTIVATORS.
No. 7,250. Reissued Aug. 1, 1876.
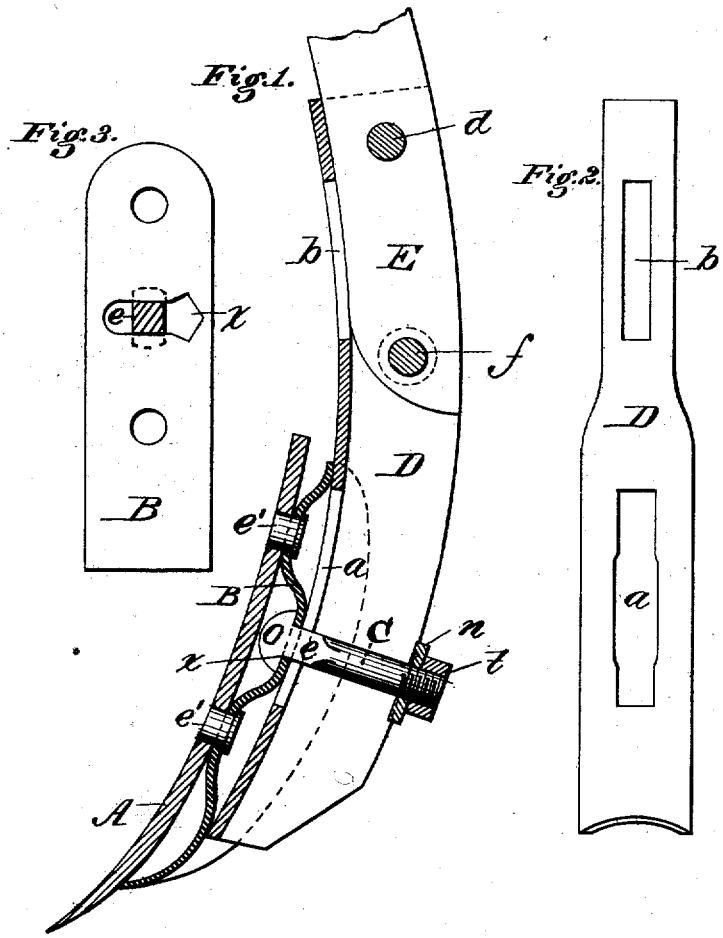
*Witnesses:*
Donn P. Turtchill
Will H. Dodge
*Inventor:*
E. P. Lynch &
E. A. Wright
by Dodgerson
Attys.
N. PETERS, PHOTO-LITHOGRAPHER, WASHINGTON, D. C.

UNITED STATES PATENT OFFICE.

EDWARD P. LYNCH AND EDGAR A. WRIGHT, OF DAVENPORT, IOWA.

IMPROVEMENT IN CULTIVATORS.

Specification forming part of Letters Patent No. 175,721, dated April 4, 1876; reissue No. 7,250, dated August 1, 1876; application filed June 28, 1876.

*To all whom it may concern:*

Be it known that we, EDWARD P. LYNCH and EDGAR A. WRIGHT, of Davenport, in the county of Scott and State of Iowa, have invented certain new and useful Improvements in Cultivators; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention we will proceed to describe it.

Our invention consists in a wrought-iron shank for connecting the shovel to the beam, having a slot formed in the front of its upper portion, to prevent the earth from becoming wedged therein, when the shank is thrown forward by the breaking of the wooden pin. It further consists in a metal block secured to the shovel, and having formed therein a slot of such form as to permit the T-head of a bolt to be inserted, the bolt turned therein to lock its head, and prevent it from being accidentally released or detached. It further consists in the combination, with the slotted shank and block, of a bolt having a square shank and a T-head, all as hereinafter more fully set forth.

Figure 1 is a side elevation of a portion of the beam, with the shank and shovel in vertical section. Fig. 2 is a front view of the shank detached; and Fig. 3 is a face view of the shovel-block detached, with the bolt in section.

The object of our invention is to provide an attachment by which the shovels of cultivators can be adjusted and secured in position with ease and certainty, and by which the shank can be replaced when the pin breaks, without hinderance from the accumulation of earth within the cavity, where it bears against the front of the beam.

In the accompanying drawing, E represents the lower end of the ordinary curved iron beam of a cultivator, and D represents the curved wrought-iron shank, which is made of a plate of iron doubled or folded at its upper portion into the form of a letter, U, so as to fit upon and clasp the beam E, as shown in Fig. 1, its lower portion being rounded or bent in a semicircular form, as shown in Fig. 2. This shank D is provided with two transverse holes, the lower one serving to receive a bolt, *f*, by which it is pivoted to the beam, and the upper one receiving the wooden break-pin *d* in the usual manner. In the upper portion of this shank, extending from about opposite the pivot-pin *f* to near its upper end, we punch or cut a slot, *b*, of a width equal to the front edge of the beam, as shown in Figs. 1 and 2. The object of this slot is to prevent the earth from being wedged or crowded into the cavity of the shank, when the upper end of the latter is thrown over forward and digs into the ground, as it does when the wooden pin *d* breaks, in consequence of the shovel striking a stone, root, or other obstruction. The slot permits the earth to pass through, and prevents it from becoming packed within the hollow of the shank, and, in case any remains, it can be easily pushed out from the front or rear, and thus obviates the difficulty incident to those which are made without any such opening, the earth in such packing in solid, and requiring considerable time and trouble to remove it before the shank can be replaced, so as to insert another wooden pin. Another slot, *a*, is made in the lower portion of the shank for the insertion of the fastening-bolt C, which holds the shovel in place on the shank. This slot *a* is made of such a width that the square shank *e* of the bolt C may slide freely up and down, but cannot be turned therein, the slot being slightly widened a portion of its length to permit the shovel, with its bolt C, to be adjusted slightly sidewise therein, but not sufficiently wide to permit the bolt to be turned in the slot. This enlargement is not absolutely necessary, as the lateral adjustment of the shovel is otherwise provided for, as hereinafter explained.

The shovel A may be of any desired form, and it has secured to its back a block, B, which is made of a plate of wrought-iron, as shown in Fig. 3. This plate has two holes by which it is secured, by rivets *e*, to the shovel, after being bent or swaged to the required form, as shown in Fig. 2. In this block B we cut or punch a transverse slot, *x*, one end of which is enlarged, as shown in Fig. 3, this slot also being of a width corresponding with the square shank *e* of the bolt C, the enlargement being sufficient to permit the bolt to be turned therein when moved to that end. We then provide a bolt, C, which has its shank *e* made square, and which has a T-shaped head, *o*. The head *o* of the bolt C is turned lengthwise of the slot *x*, and inserted through the same, after which, by sliding the bolt along to the enlarged end of the slot the bolt can be turned so as to bring its head at right angles to or crosswise of the slot, which will cause the head to lock under or against the front face of the block B, as shown in Figs. 1 and 3. The shovel is then placed upon the shank D, the stem of the bolt being inserted through the slot *a* of the shank, as shown in Fig. 1, after which a small metal cross-piece, *n*, is slipped onto the bolt, so as to bear against the rear edge of the shank, and the whole is secured by a nut, *t*. By simply loosening this nut the shovel can be adjusted vertically on the shank, the bolt C sliding in the slot *a*.

To adjust the shovel laterally it is simply turned as desired on the shank, the shank of the bolt sliding in the slot *x* of the block B. At the same time the square shank, preventing the bolt from turning in either of the slots *a* or *x*, serves to hold the shovels in a vertical position, and prevents them from being accidentally tipped to the right or left. By using the T-headed bolt and the peculiar slot in the block B the bolt can be readily inserted or removed whenever it is desired to change the shovels or the bolt, or any other part is broken.

It will be seen that by this construction the bolt C can be changed whenever necessary for any reason, the T-head being inserted through the slot *x*, the bolt then turned by sliding it along to the enlarged part—which may be of any shape— and that by then sliding it back in the slot its square shank *e* will prevent the bolt from turning, thus locking it securely in place, and preventing its head from being accidentally drawn out of the slot *x* in case the bolt becomes loosed from any cause whatever.

By these improvements we are enabled to produce a light and strong attachment, and one that is easily and readily adjusted or replaced.

Having thus described our invention, what we claim is—

1. The shank D, having a slot, *b*, formed therein opposite the front of the beam, substantially as and for the purpose set forth.

2. The shank D, provided with the slot *a*, in combination with the shovel A, having the block B, provided with the transverse slot *x* and the T-headed bolt C, all constructed to operate substantially as described.

3. The block B, secured to the shovel A, and provided with the slot *x*, of a width corresponding to the square shank of the T-headed bolt C, and having an enlargement at one end, in which said bolt can be turned, substantially as and for the purpose set forth.

4. In combination with the block B, having the slot *x*, the bolt C, provided with T-shaped head *o* and the square shank *e*, said parts being constructed to operate substantially as set forth.

EDWARD P. LYNCH.
EDGAR A. WRIGHT.

Witnesses:
C. H. DYER,
JNO. M. PRICE,
JAMES H. CLENDRUM,
THOMAS C. LYNCH.